(12) United States Patent
Appelo (10) Patent No.: US 8,956,435 B2
(45) Date of Patent: Feb. 17, 2015

(54) BAGHOUSE FILTER CAGE

(75) Inventor: Per-Erik A. Appelo, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 448 days.

(21) Appl. No.: 13/098,743

(22) Filed: May 2, 2011

(65) Prior Publication Data

US 2012/0279185 A1 Nov. 8, 2012

(51) Int. Cl.
*B01D 39/00* (2006.01)
*B01D 46/06* (2006.01)
*B01D 29/13* (2006.01)
*B01D 29/00* (2006.01)

(52) U.S. Cl.
CPC ............. *B01D 46/06* (2013.01); *B01D 29/13* (2013.01); *B01D 29/0029* (2013.01); *B01D 2265/028* (2013.01); *B01D 2265/06* (2013.01)
USPC ............. 55/492; 55/341.1; 55/361; 55/365; 55/378; 55/379; 55/490; 210/172.4; 29/428

(58) Field of Classification Search
CPC .. B01D 29/0029–29/0065; B01D 29/13–29/27
USPC ........... 55/341.1–341.7, 361–382, 490–519; 29/428–526.6; 414/800; 210/172.4, 210/485
See application file for complete search history.

(56) References Cited

U.S. PATENT DOCUMENTS

| | | | |
|---|---|---|---|
| 926,038 A * | 6/1909 | True | 210/475 |
| 3,016,984 A * | 1/1962 | Getzin | 55/492 |
| 4,014,796 A | 3/1977 | Sugiyama et al. | |
| 4,193,165 A * | 3/1980 | Malacheski et al. | 16/335 |
| 4,290,790 A | 9/1981 | Okubo | |
| 4,293,111 A * | 10/1981 | Henri | 248/95 |
| 4,336,035 A | 6/1982 | Evenstad et al. | |
| 6,267,793 B1 * | 7/2001 | Gomez et al. | 55/385.2 |
| 2002/0036208 A1 * | 3/2002 | Faulks et al. | 221/46 |
| 2005/0183404 A1 * | 8/2005 | Pipkorn et al. | 55/379 |
| 2005/0284548 A1 * | 12/2005 | Huang et al. | 148/609 |

FOREIGN PATENT DOCUMENTS

| | | |
|---|---|---|
| DE | 195 47 664 | 6/1997 |
| DE | 297 17 466 | 1/1998 |
| DE | 20305310 | 2/2004 |
| DE | 10 2006 007 020 | 8/2007 |
| EP | 1 779 915 | 5/2007 |
| EP | 2 047 896 | 4/2009 |
| EP | 2 163 291 | 3/2010 |
| GB | 1 282 194 | 7/1972 |
| JP | 09108519 | 4/1997 |
| WO | 99/19043 | 4/1999 |
| WO | WO 99/25458 | 5/1999 |

OTHER PUBLICATIONS

The International Search Report and the Written Opinion of the International Searching Authority for PCT/US2012/035950 dated Jul. 6, 2012.

* cited by examiner

*Primary Examiner* — Thomas McKenzie (57) ABSTRACT

A primary filter cage wall element is adapted to form, together with at least one complementary filter cage wall element, a tubular baghouse filter cage segment. The filter cage wall elements are provided with snap-locks, for snapping a first long side of the primary filter cage wall element to a second long side of the complementary filter cage wall element, and for snapping a second long side of the primary filter cage wall element to a first long side of the complementary filter cage wall element.

20 Claims, 10 Drawing Sheets

BAGHOUSE FILTER CAGE

TECHNICAL FIELD

The present disclosure relates to methods of storing, transporting and assembling a baghouse filter cage. The disclosure also relates to elements for forming a baghouse filter cage.

BACKGROUND

Industrial processes, such as physical or chemical processes for the fabrication, transformation, or combustion of goods or materials, may generate particulate matter carried by a process gas. In order to reduce emissions of particulate matter to the atmosphere, the process gas is often filtered in a gas cleaning plant before being discharged into the atmosphere. U.S. Pat. No. 4,336,035 discloses a baghouse filter for such purposes. The baghouse filter of U.S. Pat. No. 4,336,035 comprises a plurality of tubular filter bags, each of which is retained in its tubular shape by a filter cage.

Baghouse filter cages may typically be up to tens of meters long; therefore, transporting them from their site of manufacture to their site of use, i.e. to the gas cleaning plant, may be difficult and costly, adding to the cost of setting up and maintaining a gas cleaning plant. In order to facilitate transporting the baghouse filter cages, they are sometimes fabricated and transported in shorter segments, which are then connected in series on their site of use. EP 1779915 discloses a design of a baghouse filter cage segment allowing several segments to be connected in series to form a baghouse filter cage.

SUMMARY

It is an object to even further mitigate parts or all of the above mentioned problems. According to an aspect illustrated herein, there is provided a primary filter cage wall element for forming, together with at least one complementary filter cage wall element, a tubular baghouse filter cage segment. Said primary filter cage wall element has the shape of a grate with an end for forming a portion of a tube orifice of said tubular baghouse filter cage segment, and a long side for connecting to a long side of said complementary filter cage wall element. The long side of said primary filter cage wall element is equipped with a fastening device for attachment to the long side of said complementary filter cage wall element. Such wall elements are easier to handle than an entire segment. Furthermore, multiple filter cage wall elements may be compactly stacked on top of each other during transport and storage, thereby saving significant transport and/or storage volume and associated costs. Throughout this disclosure, the terms "primary" and "complementary" do not signify any physical attributes or order of importance, but are merely employed to facilitate distinguishing between different filter cage wall elements while reading.

According to an embodiment, said primary filter cage wall element comprises a plurality of peripherally spaced, longitudinal bars fixed by a plurality of transversal support members. The primary filter cage wall element, having a long side, and a short side or end, has an elongated shape defined by said end and said long side. Throughout this disclosure, the term longitudinal is defined as extending mainly in a longitudinal direction of the elongated filter cage wall element. Similarly, the term transversal denotes a direction that is transversal to said longitudinal direction.

According to an embodiment, at least one of said transversal support members is formed by a metal wire. A portion of said transversal metal wire extends beyond said long side of said primary filter cage wall element to form said fastening device. Thereby, the need for separate fastening devices attached to the primary filter cage wall element is reduced.

According to an embodiment, said fastening device is a snap-lock. Thereby, quick, simple and tool-free assembly of the baghouse filter cage segment may be achieved. By way of example, said snap-lock may be formed by a snap-lock portion extending beyond said long side, said snap-lock portion comprising a camming portion for camming, when said primary filter cage wall element is pressed against said complementary filter cage wall element, against a counter-cam element of said complementary filter cage wall element. Such a fastening device is relatively simple to fabricate and use, and is capable of interacting with a relatively simple structure on the complementary filter cage wall element.

According to an embodiment, said snap-lock portion further comprises a locking notch for engaging with said counter-cam element of said complementary filter cage wall element when said primary and complementary filter cage wall elements are pressed together. When pressed together, said camming portion of said snap-lock portion passes said counter-cam element of said complementary filter cage wall element. Such a locking notch warrants that the complementary filter cage wall element lock to the primary filter cage wall element at a well-defined position.

According to an embodiment, said counter-cam element is formed by a longitudinal metal wire of said complementary filter cage wall element. This arrangement reduces the need for any separate structure on the complementary filter cage wall element for interacting with the snap-lock portion.

According to an embodiment, said primary filter cage wall element has a second long side adapted for attaching to a second long side of said complementary filter cage wall element. Such a filter cage wall element enables the assembly of a baghouse filter cage segment from only two filter cage wall elements resulting in increased mechanical stability of the baghouse filter cage segment.

According to an embodiment, said second long side of said primary filter cage wall element is adapted for engaging with a fastening device of said second long side of said complementary filter cage wall element, the fastening device of said complementary filter cage wall element being identical to the fastening device of the primary filter cage wall element. According to an embodiment, said primary filter cage wall element is adapted for connecting to a complementary filter cage wall element that is identical to said primary filter cage wall element. Such a design results in an improved economy of scale, and simplifies inventory management.

According to an embodiment, an end of said primary filter cage wall element is provided with a bottom cuff. Said bottom cuff comprises an interior facing slot for receiving an outwardly extended flange of an end of said complementary filter cage wall element, for forming a pivoting flange-cuff engagement. Such a design facilitates the longitudinal alignment of the primary and complementary filter cage wall elements during assembly. Furthermore, the bottom cuff provides additional mechanical stability to the baghouse filter cage segment. Throughout this disclosure, interior facing is defined as being directed inwardly, towards the interior of the tubular baghouse filter cage segment. Similarly, outwardly is defined as exterior facing, directed away from the interior of the tubular baghouse filter cage segment.

According to an embodiment, said primary filter cage wall element is provided with a lock member for releasibly locking a width of a longitudinal slit extending from said tube orifice. This allows for a simple way of connecting two baghouse filter cage segments in series.

According to another aspect, there is provided a kit for forming a tubular baghouse filter cage segment, the kit comprising a primary filter cage wall element according to any of the previously described embodiments, and at least one complementary filter cage wall element. According to an embodiment, the kit also comprises a locking ring for connecting two tubular baghouse filter cage segments in series.

According to another aspect, there is provided a method of assembling a baghouse filter cage segment. The method comprises joining a long side of an elongated, grate-shaped primary filter cage wall element with a long side of an elongated, grate-shaped complementary filter cage wall element. The filter cage wall elements may be joined on the site of use, which allows for simplified storage, handling and/or transporting from the site of manufacture. In particular, the filter cage wall elements may be stacked compactly, thereby saving significant volume and associated costs.

According to an embodiment, the method comprises snapping said primary and complementary filter cage wall elements together. Such assembly is relatively fast and simple.

According to an embodiment, the method comprises inserting an outwardly extending flange of an end of said complementary filter cage wall element into an interior facing slot of a bottom cuff attached to an end of said primary filter cage wall element. Such forms a flange-cuff engagement for pivoting of said complementary filter cage wall element about said flange-cuff engagement until said primary and complementary filter cage wall elements are essentially parallel and rest against each other. As such, said end of the complementary filter cage wall element is trapped between said interior facing slot and said primary filter cage wall element. Thereby, longitudinal alignment of primary and complementary filter cage wall elements is simplified, and increased mechanical stability of the baghouse filter cage segment is achieved.

According to another aspect, there is provided a method of locking an exteriorly extended flange of a tube orifice of a first tubular baghouse filter cage segment to an interior facing slot of a circumferential locking ring. The method comprises inserting a tube orifice of a second tubular baghouse filter cage segment into the tube orifice of said first tubular baghouse filter cage segment; expanding the tube orifice of said second tubular baghouse filter cage segment to abutment against said first tubular baghouse filter cage segment; and locking the tube orifice of said second tubular baghouse filter cage segment in an expanded state, such that said flange of said first tubular baghouse filter cage segment becomes trapped in said slot of said circumferential locking ring. Using such a method, the first and second baghouse filter cage segments may be locked to the locking ring by the same operation. Furthermore, no separate means for locking the tube orifice of the first tubular filter cage segment in an expanded state is needed.

According to an embodiment, each of said tube orifices comprises a plurality of longitudinal bars. The longitudinal bars of the tube orifice of said second tubular baghouse filter cage segment intermesh with the longitudinal bars of the tube orifice of said first tubular baghouse filter cage segment, when the tube orifice of said second tubular baghouse filter cage segment has been expanded. Said first and second tubular baghouse filter cage segments are thereby prevented from rotating relative to each other. This increases the mechanical stability of the interface between the first and second baghouse filter cage segments, and reduces segment wear.

According to another aspect, there is provided a method of storing and/or transporting a baghouse filter cage segment. The method comprises storing and/or transporting said baghouse filter cage segment longitudinally divided into elongated, grate-shaped filter cage wall elements. By storing and/or transporting the baghouse filter cage segment in this manner, each item is more manageable. Furthermore, the longitudinal division makes it possible to stack the filter cage wall elements in a compact way. According to an embodiment, said filter cage wall elements are stacked on top of each other, an exterior surface of one filter cage wall element resting against an interior surface of another filter cage wall element. This way of stacking is particularly suitable for curved elements, and results in a compact filter cage wall element stack.

BRIEF DESCRIPTION OF THE DRAWINGS

The above, as well as additional objects, features and advantages, will be better understood through the following illustrative and non-limiting detailed description of preferred embodiments, with reference to the appended drawings, where the same reference numerals will be used for similar elements, wherein:

FIG. 2b is a diagrammatic view in perspective of a baghouse filter cage segment formed by the two filter cage wall elements of FIG. 2a;

DETAILED DESCRIPTION OF THE EXEMPLARY EMBODIMENTS

Figure 1:
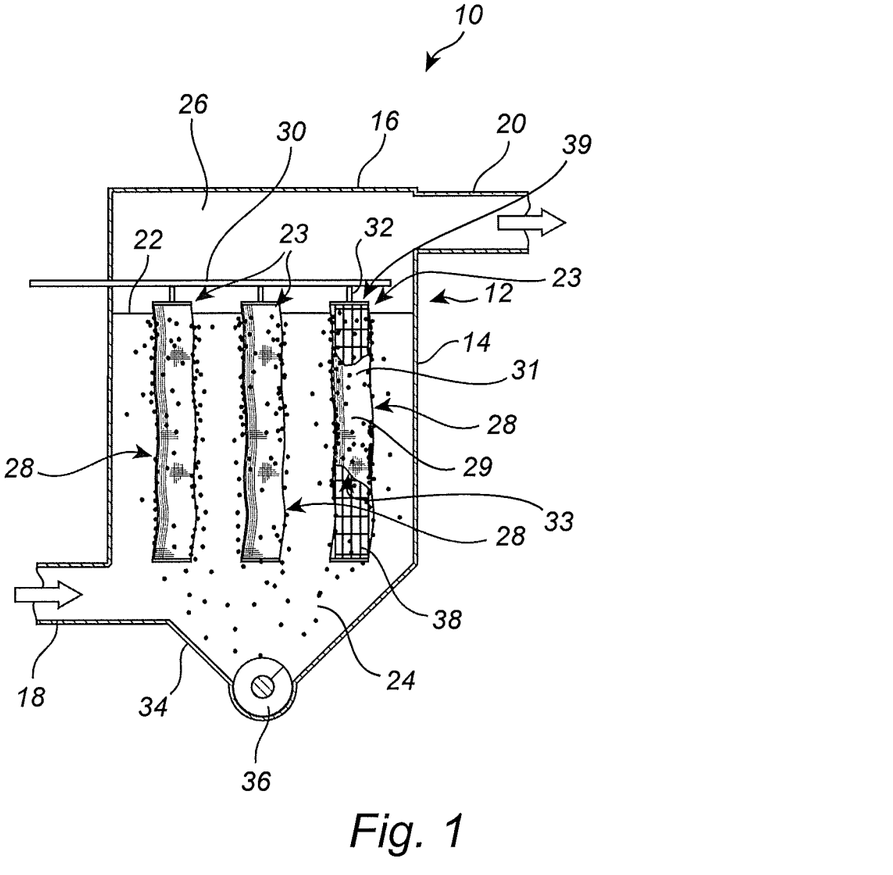
FIG. 1 is a schematic side view in cross section of a baghouse filter.

FIG. 1 is a schematic illustration of a baghouse filter 10. The baghouse filter 10 comprises a housing 12 divided into a lower housing portion 14 and an upper housing portion 16. The lower housing portion 14 is provided with a raw gas inlet 18, for receiving raw, particle-laden gas generated by an industrial process. Throughout this disclosure, raw gas is defined as particle-laden gas, originating from an industrial process, to be cleaned in a gas cleaning device. The raw gas entering baghouse filter 10 via inlet 18 may, by way of example, be flue gas from a boiler (not illustrated) located upstream with respect to a gas flow direction, of baghouse filter 10. The raw gas arriving at baghouse filter 10 may be completely uncleaned, or as an alternative, may already have been subject to some initial cleaning in any upstream located gas cleaning equipment, such as an electrostatic precipitator. The upper housing portion 16 is provided with a cleaned gas outlet 20, for channelling gas cleaned by baghouse filter 10 to any equipment (not shown) located downstream of baghouse filter 10. Such equipment located downstream of baghouse fabric filter 10 may, by way of example, be equipment for subsequent, additional cleaning of the gas, or a smoke stack for discharging the cleaned gas into the atmosphere.

A horizontal plate 22 is arranged in housing 12 to divide the space defined by housing 12 into a raw gas inlet chamber 24, located below horizontal plate 22, and a cleaned gas outlet chamber 26, located above horizontal plate 22. The raw gas inlet chamber 24, defined by lower housing portion 14 and horizontal plate 22, is fluidly connected to raw gas inlet 18. Cleaned gas outlet chamber 26 defined by upper housing portion 16 and horizontal plate 22, is fluidly connected to cleaned gas outlet 20. In each of a plurality of openings 23 in horizontal plate 22, a filter bag 28 is arranged. Each such filter bag 28, which may comprise a filter material such as fabric 29, extends through one opening 23 in horizontal plate 22. Typically, a baghouse filter 10 may comprise 2 to 20,000 such filter bags 28, and usually, for larger installations, comprises at least 20. In operation, raw gas enters raw gas inlet chamber 24 via raw gas inlet 18. The gas flows through the fabric 29 of bags 28 and into the interior 33 of the filter bags 28, while dust particles are collected on the outside 31 of the fabric 29 of filter bags 28, such that the gas, when flowing through the fabric 29 of the filter bags 28, is cleaned. The cleaned gas flows via the interior 33 of the filter bags 28, through the openings 23 of horizontal plate 22, into the cleaned gas outlet chamber 26, and leaves the baghouse filter 10 via the cleaned gas outlet 20.

Occasionally, it is necessary to remove collected dust particles from the filter bags 28. To this end, a pulsing gas duct 30 is arranged in the upper portion 16 of the baghouse filter 10. The pulsing gas duct 30 is provided with one pulsing nozzle 32 for each of the filter bags 28. When it has been determined that it is suitable to remove collected dust particles from the filter bags 28, a short pulse of gas is directed, via the pulsing gas duct 30 and the respective pulsing nozzles 32, into the filter bags 28. As an effect of such pulsing gas, the filter bags 28 expand rapidly, causing most, if not all, of the dust collected thereon to be released from the filter bags 28. Such released dust falls down into a hopper 34 of the lower portion 14 of the housing 12. Occasionally, the dust is removed from the hopper 34 by means of, for example, a screw 36.

Due to the gas flow resistance of the fabric 29 of the filter bags 28, the pressure of the gas drops as the gas flows from the raw gas inlet chamber 24, to the cleaned gas outlet chamber 26. In order to keep the filter bags 28 expanded in their tubular shape while the flow of gas acts as a compressive force on the filter bags 28, each of the filter bags 28 is mounted on a baghouse filter cage 38 for supporting the filter bag 28. In FIG. 1, a small portion of a filter bag 28 is "broken away" so as to reveal a portion of such a baghouse filter cage 38. Each support cage 38 has an elongated, cylindrical shape formed from a "grate-like" material and extends into the raw gas inlet chamber 24. Each baghouse filter cage 38 has an upper end 39 attached to one of said openings 23 of horizontal plate 22. Typically, a baghouse filter cage 38 may have a length of from about one meter to about twenty meters, and a width of from about ten centimeters to about one meter. In order to facilitate handling of the baghouse filter cage 38, e.g. during transport and/or storage, the baghouse filter cage 38 may be assembled from several shorter baghouse filter cage segments 41a, 41b, as will be explained in more detail below with reference to FIGS. 4a-c.

Figure 2A:
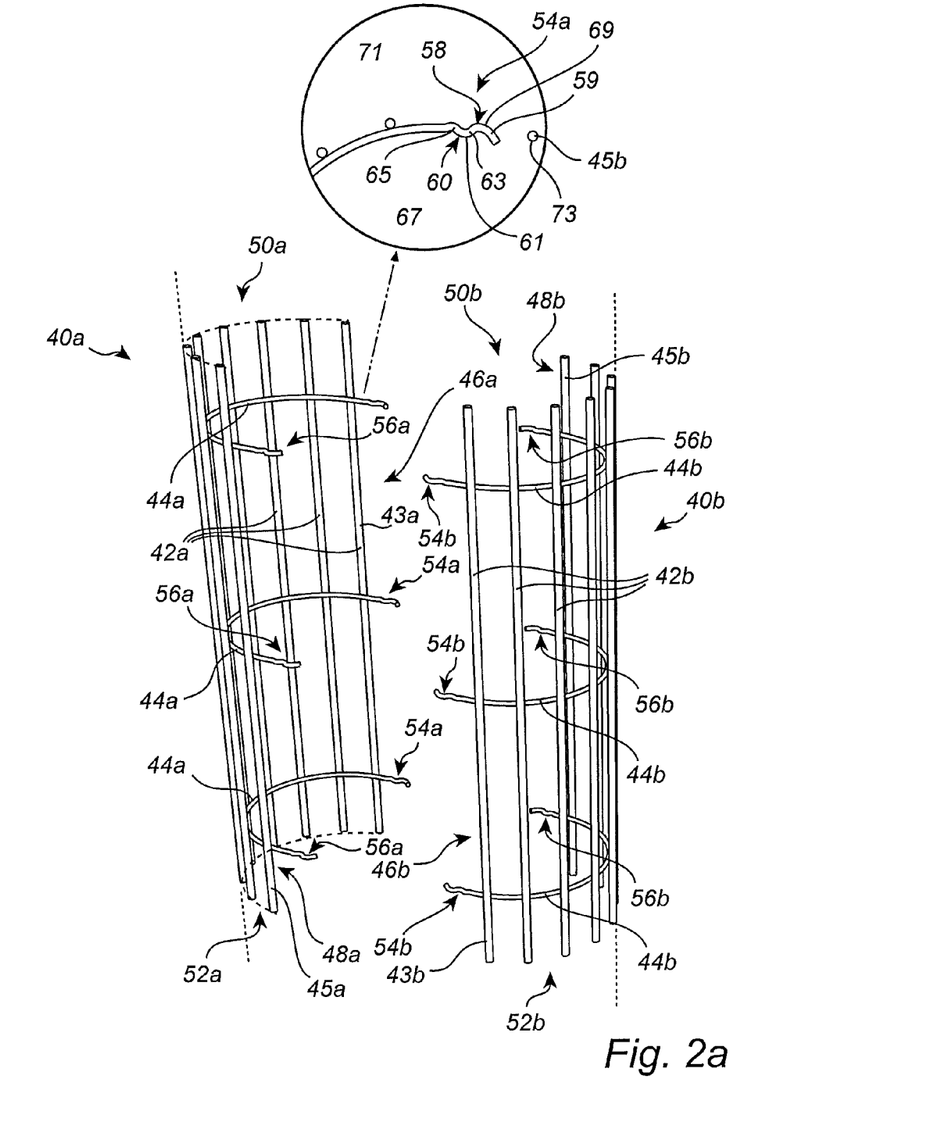
FIG. 2a is a diagrammatic view in perspective of two filter cage wall elements.
Figure 2B:
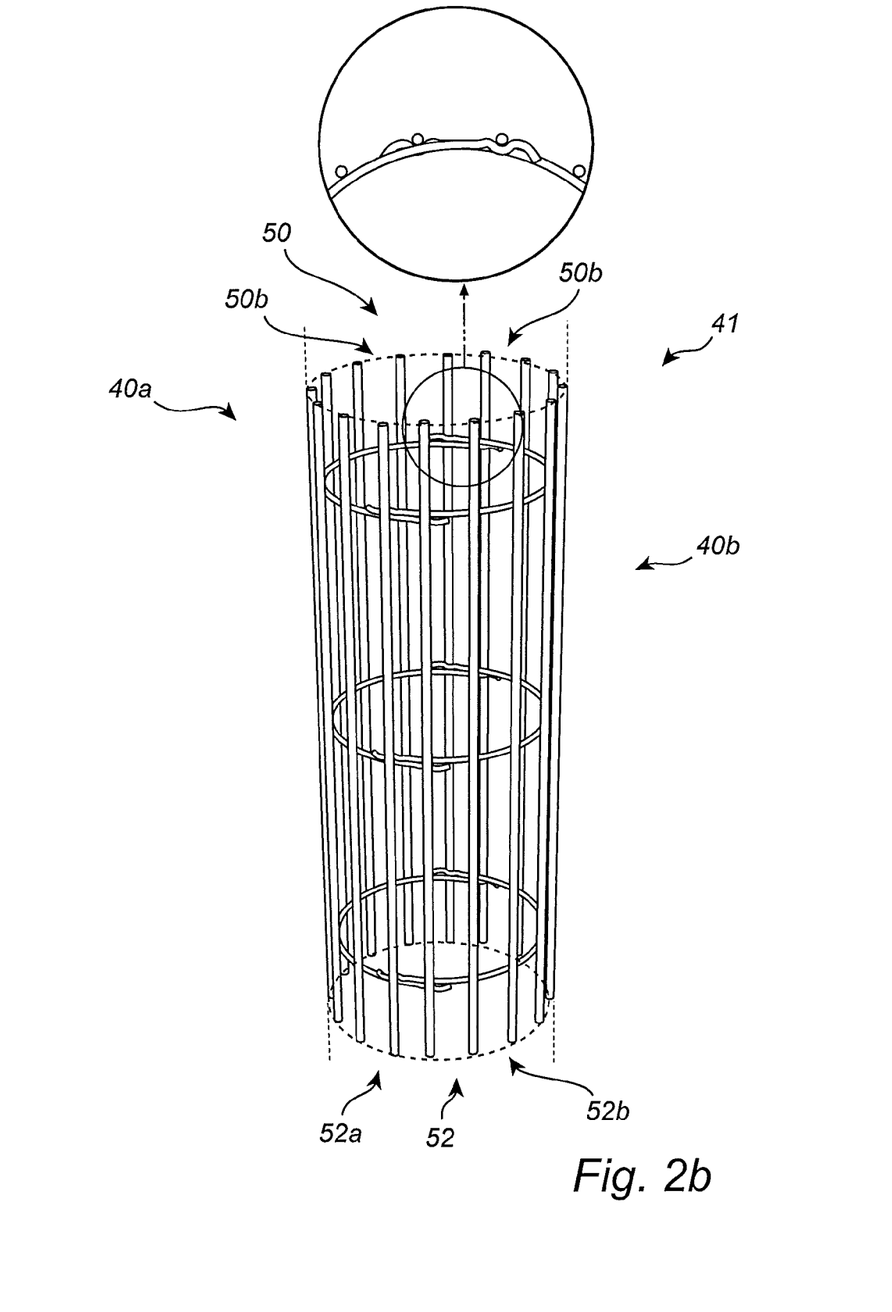

FIGS. 2a-b schematically illustrate the assembly of a baghouse filter cage segment 41 (FIG. 2b) from two separate filter cage wall elements 40a-b. A first, primary filter cage wall element 40a has the general shape of an elongated, hemi-tubular shaped grate or mesh formed by a plurality of longitudinal bars 42a and a plurality of transversal support members 44a. Each of the longitudinal bars 42a is formed by a metal wire 42a extending in a longitudinal direction of the elongated filter cage wall element 40a. The longitudinal bars 42a are rigidly connected, e.g. by welding, to the transversal support members 44a, each of which is in the form of an arcuate metal wire 44a extending latitudinally or transversally to the cage wall element's 40a longitudinal direction. As such, the curved, hemi-tubular shaped structure formed by the rigidly connected longitudinal bars 42a and support members 44a is self-supporting. The primary filter cage wall element 40a has a first long side 46a, defined by a first peripheral longitudinal bar 43a of said longitudinal bars 42, and a second long side 48a, defined by a second peripheral longitudinal bar 45a of said longitudinal bars 42a. Opposed long sides 46a and 48a extend along the longitudinal length of primary filter cage wall element 40a. The primary filter cage wall element 40a also has an upper end 50a and a lower end 52a, said upper and lower ends 50a, 52a being formed as short sides 50a, 52a of said primary filter cage wall element. Opposed upper and lower ends 50a and 52a, illustrated by dotted lines, are each generally significantly shorter in length, if measuring the length of the arcs, than each of the lengths of long sides 46a and 48a. For reasons of clarity, only a portion of the longitudinal length of the primary filter cage wall element 40a is illustrated in FIG. 2a; hence, it will be appreciated that the primary filter cage wall element 40a may be much longer, and the upper and lower ends 50a, 52a may have another design than the one illustrated in FIGS. 2a-b. Such will be elucidated below by way of examples with reference to FIGS. 3-5.

Referring again to FIG. 2a, a second, complementary filter cage wall element 40b of an elongated, hemi-tubular shape is formed by a mesh of longitudinal bars 42b and transversal support members 44b. The longitudinal bars 42b are formed by individual metal wires 42b extending in the longitudinal direction of the elongated complementary filter cage wall element 40b. Longitudinal bars 42b are rigidly connected, e.g. by welding, to the transversal support members 44b, which are formed by individual arcuate metal wires 44b fixed latitudinally or transversally to the length of longitudinal bars 42b, and hence to the length of the filter cage wall element 40b. The rigid connections between longitudinal bars 42b and support members 44b make the curved, hemi-tubular shape of filter cage wall element 40b self-supporting. Complementary filter cage wall element 40b has a first long side 46b, defined by a first peripheral longitudinal bar 43b of said longitudinal bars 42b, and a second long side 48b, defined by a second peripheral longitudinal bar 45b of said longitudinal bars 42b. Opposed long sides 46b, 48b extend longitudinally to form the length of filter cage wall element 40b. Complementary filter cage wall element 40b also has an upper end 50b and a lower end 52b. Opposed upper and lower ends 50b and 52b, if measuring the length of the arcs, are each shorter in length than that of each of the long sides 46b and 48b.

Returning now to the primary filter cage wall element 40a, each of the transversal support members 44a illustrated in FIG. 2a has a first end 54a of metal wire extending perpendicularly outwardly beyond first long side 46a. The first end 54a of each transversal support member 44a is bent or configured so as to form a snap-lock portion 53 for attachment to the second long side 48b of complementary filter cage wall element 40b. A magnified view of a portion of FIG. 2a illustrates the second peripheral longitudinal bar 45*b* defining the second long side 48*b* of complementary filter cage wall element 40*b*, and a single first end 54*a* of a transversal support member 44*a* extending beyond first long side 46*a* of complementary filter cage wall element 40*a*. First end 54*a* is bent or configured to have two opposed arc bends 58 and 60. Opposed arc bends 58 and 60 are formed in first end 54*a* so that peak 61 between opposed arc base legs 63 and 65 of arc bend 60 extends inwardly toward interior 67 of filter cage wall element 40*a* and peak 69 between opposed arc base legs 63 and 59 of arc bend 58 extends outwardly toward exterior 71 of filter cage wall element 40*a*. Upon assembly of primary filter cage wall element 40*a* with complementary filter cage wall element 40*b*, second peripheral, longitudinal bar 45*b* of filter cage wall element 40*b* abuts arc bend 60 between arc base legs 63 and 65. Hence, arc bend 60 forms a locking notch to snappingly receive and retain longitudinal bar 45*b*. Arc bend 58 forms a cam for camming against longitudinal bar 45*b*. As such, inner surface 73 of the second peripheral longitudinal bar 45*b* of complementary filter cage wall element 40*b* forms a counter-cam element adapted to cammingly cooperate with arc bend 58 of the first end 54*a*. Similarly, each of the transversal support members 44*a*, illustrated in FIG. 2*a*, of the primary filter cage wall element 40*a* also has a second end 56*a*, which extends beyond the second long side 48*a*, and is bent or configured in like manner as that described above so as to form a snap-lock for retaining the first peripheral longitudinal bar 43*b* of first long side 46*b* of the complementary filter cage wall element 40*b* in a manner similar to what has been described above with reference to the first transversal support member ends 54*a* and the second peripheral, longitudinal bar 45*b*.

Also the transversal support members 44*b*, illustrated in FIG. 2*a*, of the complementary filter cage wall element 40*b*, each have a first and a second end 54*b*, 56*b*, which are likewise bent or configured to form snap-locks for retaining second and first peripheral, longitudinal bars 45*a*, 43*a* of the primary filter cage wall element 40*a*. In fact, the primary and complementary filter cage wall elements 40*a-b* may, according to an embodiment, be identical. Even though all the transversal support members 44*a-b* illustrated in FIGS. 2*a-b* are provided with snap-lock ends 54*a-b*, 56*a-b*, the filter cage wall elements 40*a-b* may also be provided with additional transversal support members that do not function as fastening devices. This will be illustrated by way of example below with reference to FIGS. 3*a-c* and 4*a-c*.

Referring again to FIGS. 2*a-b*, the hemi-tubular shaped primary and complementary filter cage wall elements 40*a-b* are adapted to be joined by pressing them together, such that they snap together and form a tubular baghouse filter cage segment. As the primary and complementary filter cage wall elements 40*a-b* are pressed together, the ends 54*a-b*, 56*a-b* of the transversal support members are initially deflected inwardly toward interior 67 of filter cage wall elements 40*a-b*, against a spring action intrinsic of metal wire ends 54*a-b*, 56*a-b*, by their camming engagement with the respective peripheral, longitudinal bars 43*a-b*, 45*a-b*. Once the camming arc bends 58 of the transversal support member ends 54*a-b*, 56*a-b* have passed the respective peripheral, longitudinal bars 43*a-b*, 45*a-b*, the same intrinsic spring action of the transversal support member ends 54*a-b*, 56*a-b* will flex the transversal support member ends 54*a-b*, 56*a-b* outwardly toward exterior 71 of filter cage wall elements 40*a-b*, such that the peripheral, longitudinal bars 43*a-b*, 45*a-b* are trapped in the locking notch formed by arc bends 60 of the metal wire ends 54*a-b*, 56*a-b*.

FIG. 2*b* illustrates the two filter cage wall elements 40*a-b* after having been snapped together to form a tubular baghouse filter cage segment 41. The upper ends 50*a-b* of the primary and complementary filter cage wall elements 40*a-b* together form an upper tube orifice 50 of said tubular baghouse filter cage segment 41, and the lower ends 52*a-b* in a corresponding manner form a lower tube orifice 52.

The tubular baghouse filter cage segment 41 of FIG. 2*b* is suitable for use in a baghouse filter 10 (FIG. 1) as it is, for supporting a filter bag 28. According to an embodiment, however, it may also be provided with a bottom cuff, for increased mechanical stability and/or ease of alignment of the primary and complementary filter cage wall elements 40*a-b* during assembly.

Figures 3A, 3B, 3C:
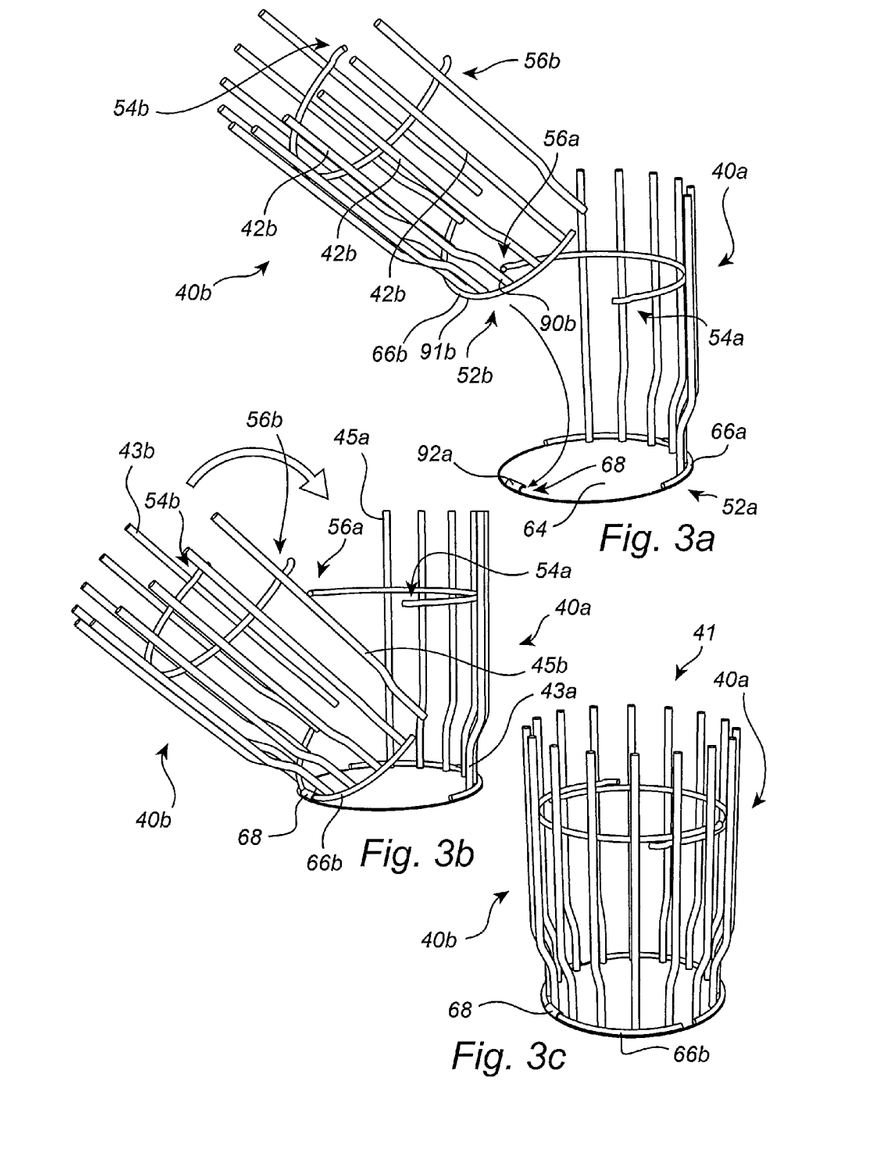
FIG. 3a is a schematic view in perspective of two filter cage wall elements.
FIG. 3b is a schematic view in perspective of the two filter cage wall elements of FIG. 3a during assembly.
FIG. 3c is a schematic view in perspective of a baghouse filter cage segment assembled from the two filter cage wall elements of FIGS. 3a-b.

FIG. 3*a* illustrates a primary filter cage wall element 40*a* that is provided with a bottom cuff 64. The bottom cuff 64 is rigidly connected, e.g. by welding, to the lower end 52*a* of the primary filter cage wall element 40*a*, such that, when in use, it covers the lower tube orifice 52 (FIG. 2*b*). A complementary filter cage wall element 40*b* is at its lower end 52*b* provided with a transversal support member 91*b*, which is attached to an outer side 90*b* of longitudinal bars 42*b* of the complementary filter cage wall element 40*b* so as to form outwardly directed flange 66*b*. Again, for reasons of clarity, only a portion of the length of the primary and complementary filter cage wall elements 40*a-b* are illustrated in FIGS. 3*a-c*. The bottom cuff 64 of the primary filter cage wall element 40*a* is provided with a bracket 92*a*, which forms a slot 68 open to interior 67 (FIG. 2*a*) of filter cage wall elements 40*a-b* for receiving the outwardly directed flange 66*b* of the complementary filter cage wall element 40*b*. Both filter cage wall elements 40*a-b* are provided with snap-lock ends 54*a-b*, 56*a-b*, such that they may be snapped together in a manner similar to what has been described hereinbefore with reference to FIGS. 2*a-b*.

A baghouse filter cage segment 41 may be assembled from the two separate filter cage wall elements 40*a-b* according to the following description. First, as is illustrated in FIG. 3*a*, the outwardly directed flange 66*b* of the complementary filter cage wall element 40*b* is inserted into slot 68 of bottom cuff 64 of the primary filter cage wall element 40*a*, so as to form a pivoting flange-cuff engagement. Then, as is illustrated in FIG. 3*b*, the complementary filter cage wall element 40*b* is pivoted about said flange-cuff engagement until said primary and complementary filter cage wall elements 40*a-b* have reached the position of FIG. 3*c*, i.e. the primary and complementary filter cage wall elements 40*a-b* are essentially parallel and rest against each other. During the pivoting motion of FIG. 3*b*, the snap-lock ends 54*a*, 56*a* of the primary filter cage wall element 40*a* snap into engagement with peripheral, longitudinal bars 43*b*, 45*b* of the complementary filter cage wall element 40*b*. At the same time, the snap-lock ends 54*b*, 56*b* of the complementary filter cage wall element 40*b* snap into engagement with peripheral, longitudinal bars 43*a*, 45*a* of the primary filter cage wall element 40*a*. The engagement between the primary and complementary filter cage wall elements 40*a-b* prevents any additional inward motion of the complementary filter cage wall element 40*b*, such that the flange 66*b* cannot slip out of the bracket 68. Thereby, the complementary cage wall element 40*b* is trapped between said bracket 92*a* and said primary filter cage wall element 40*a*. Together, the primary and complementary filter cage wall elements 40*a-b* form a baghouse filter cage segment 41.

The bottom cuff 64 does not need to be pre-welded to the primary filter cage wall element 40*a*. As an alternative, the bottom cuff may be provided with an additional bracket (not shown) for engaging with an outwardly directed flange 66*a*

(FIG. 3a) of the primary filter cage wall element in a manner similar to the engagement between the bracket 68 and the flange 66b of the complementary filter cage wall element 40b.

Each of the single, tubular baghouse filter cage segments 41 of FIG. 2b or 3c may be installed in a baghouse filter 10 (FIG. 1) as it is, for supporting a filter bag 28. Alternatively, each of them may be connected in series with one or several additional baghouse filter cage segment(s) 41, so as to form an aggregate baghouse filter cage that is longer than a single segment 41. In such an arrangement, only the lowermost filter cage segment 41, if any, would typically be provided with a bottom cuff 64.

Figure 4A:
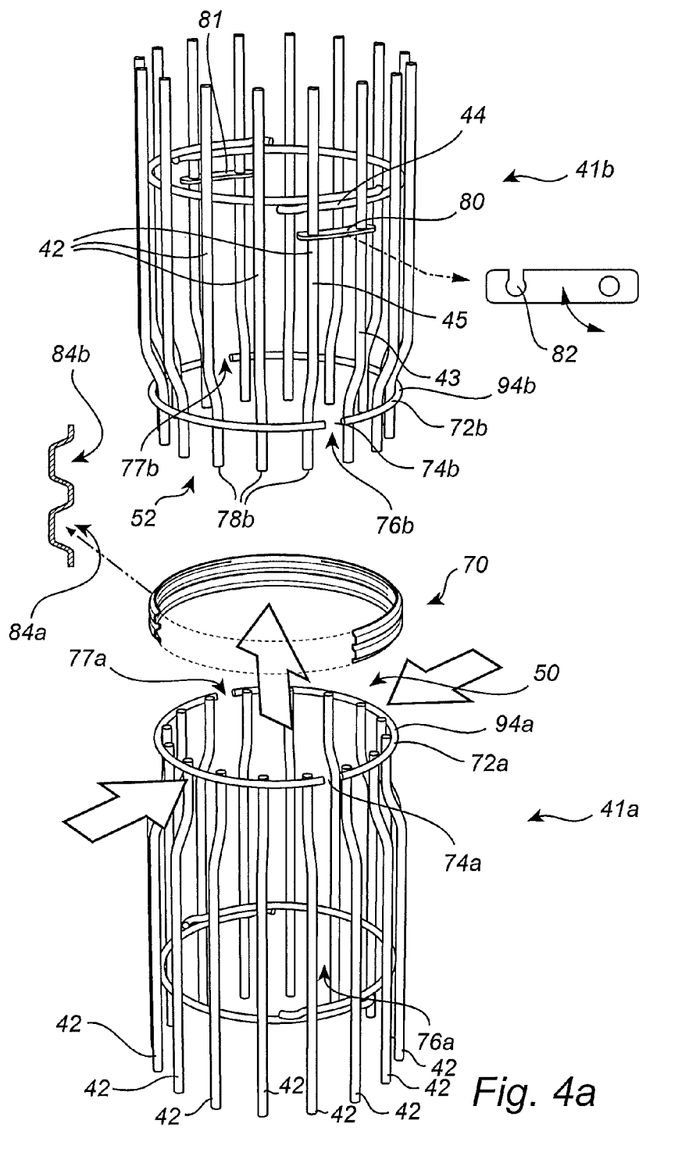
FIG. 4a is a schematic view in perspective of two baghouse filter cage segments.
Figure 4B:
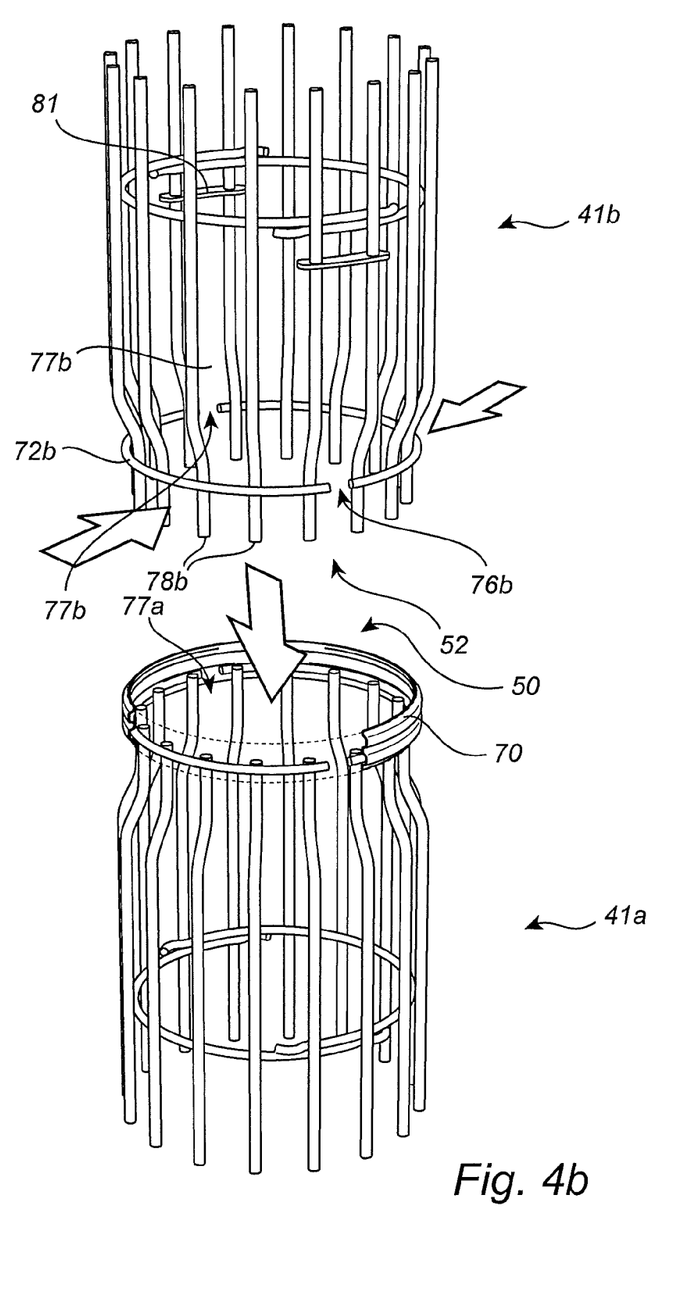
FIG. 4b is a schematic view in perspective of the two baghouse filter cage segments of FIG. 4a at an intermediate stage during assembly.
Figure 4C:
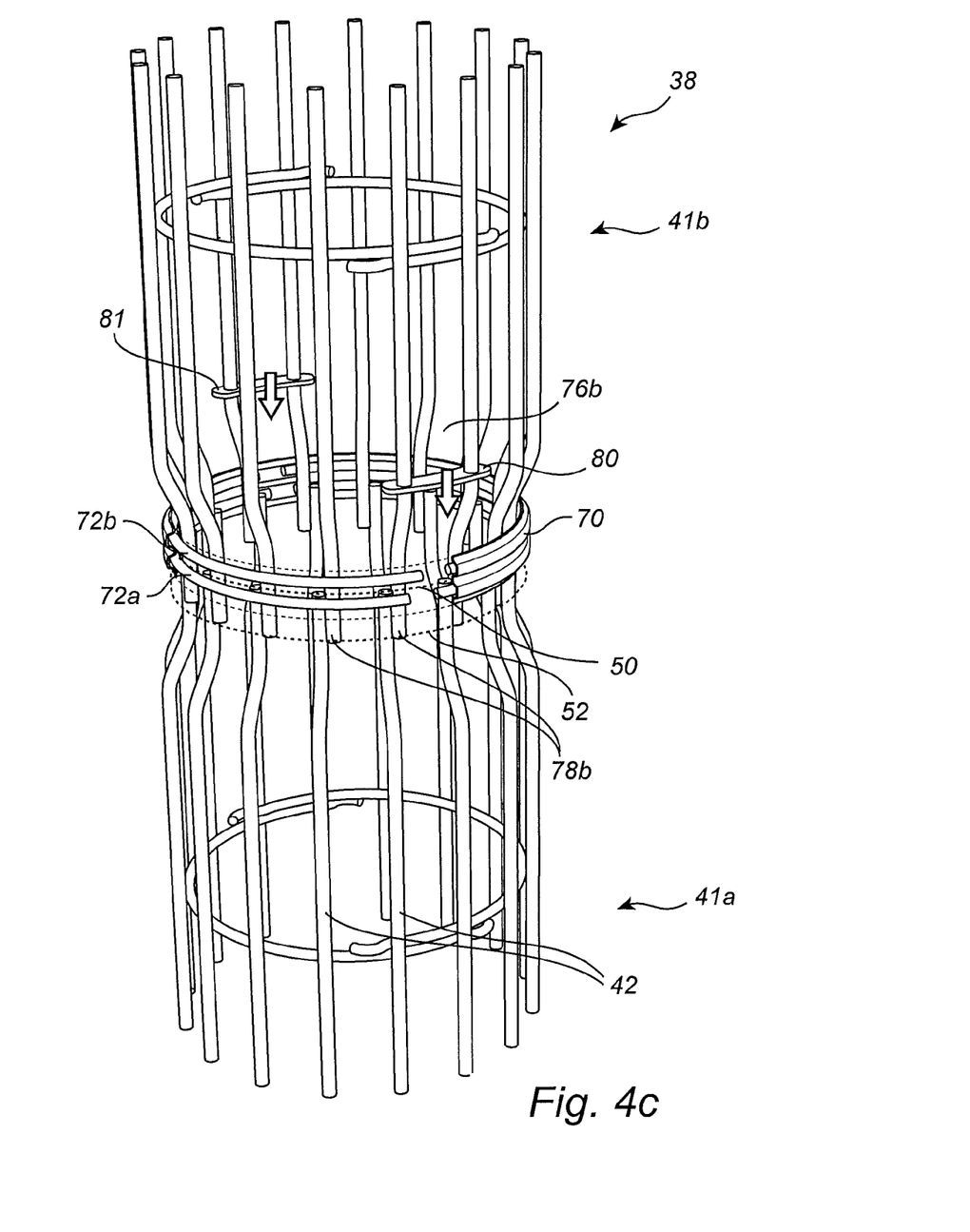
FIG. 4c is a schematic view in perspective of a baghouse filter cage assembled from the two baghouse filter cage segments of FIGS. 4a-b.

FIGS. 4a-c illustrate how a first, lower tubular baghouse filter cage segment 41a may be connected in series with a second, upper tubular baghouse filter cage segment 41b, and how the two baghouse filter cage segments 41a-b may be locked together using a circumferential locking ring 70. Each of the two baghouse filter cage segments 41a-b may have been fabricated from two filter cage wall elements 40a, 40b in accordance with the teachings hereinbefore with reference to FIGS. 2a-b. Again, for reasons of clarity, only a portion of the length of the first and second baghouse filter cage segments 41a-b are illustrated in FIGS. 4a-c.

The lower baghouse filter cage segment 41a is, at its upper orifice 50, provided with a circumferential metal member 94a, which forms an outwardly directed flange 72a. The flange 72a is provided with a gap 74a, which opens into a first longitudinal slit 76a extending away from the orifice 50 along and between longitudinal bars 42 of the lower baghouse filter segment 41a. A similar, second longitudinal slit 77a is located across the orifice 50, opposite the first longitudinal slit 76a. The longitudinal slits 76a, 77a allow the orifice 50 to be somewhat compressed, as is illustrated by arrows, such that the orifice 50 may be inserted into the circumferential locking ring 70.

Similarly, the upper baghouse filter cage segment 41b is, adjacent to its lower orifice 52, provided with a circumferential metal member 94b, which forms an outwardly directed flange 72b. Longitudinal metal wire ends 78b, formed by longitudinal bars 42 of the upper baghouse filter cage segment 41b, extend somewhat beyond the flange 72b, such that the orifice 52 includes circumferentially distributed tip ends 78b of the longitudinal bars 42. The flange 72b is provided with a gap 74b, which opens a first longitudinal slit 76b extending away from the orifice 52 along and between longitudinal bars 42 of the upper baghouse filter cage segment wall 41b. The first longitudinal slit 76b of the upper baghouse filter cage segment 41b is thereby defined by a transversal support member 44, and first and second peripheral, longitudinal bars 43, 45. A similar, second longitudinal slit 77b of the upper baghouse filter cage segment 41b is located across the orifice 52, opposite the first longitudinal slit 76b. The longitudinal slits 76b, 77b of the upper baghouse filter cage segment 41b allow also the lower orifice 52 of the upper baghouse filter cage segment 41b to be somewhat compressed, such that the tip ends 78b of the longitudinal bars 42 of orifice 52 may be inserted into the circumferential locking ring 70.

The slit 76b is provided with a lock member in the form of a sliding element 80, which is pivotably and slidingly connected to the first peripheral, longitudinal bar 43. The sliding element 80 has a snap-lock recess 82 for snappingly receiving the second peripheral, longitudinal bar 45, such that the sliding element 80, when snapping to the second peripheral, longitudinal bar 45, locks and maintains the distance between the first and second peripheral, longitudinal bars 43, 45. By sliding the sliding element 80 along the slit 76b towards the orifice 52, the sliding element 80 determines and locks the width, adjacent to the orifice 52, of the first longitudinal slit 76b. A similar sliding element 81 is arranged at the second longitudinal slit 77b, for slidingly locking the width of said second longitudinal slit 77b adjacent to the orifice 52. Locking and maintaining the widths of the first and second longitudinal slits 76b, 77b adjacent to the orifice 52 also maintains and locks the size of the orifice 52.

The locking ring 70 is provided with a lower, interior slot 84a for receiving the outwardly extended flange 72a of the lower baghouse filter cage segment 41a, and an upper, interior slot 84b for receiving the outwardly extended flange 72b of the upper baghouse filter cage segment 41b. A baghouse filter cage, comprising the two baghouse filter cage segments 41a, 41b connected in series, may be assembled from the two baghouse filter cage segments 41a, 41b according to the following description.

As is illustrated in FIG. 4a, the sliding element 80 of the upper baghouse filter cage segment 41b is snapped onto the second peripheral, longitudinal bar 45, such that it slidably bridges the first longitudinal slit 76b. Similarly, the sliding element 81 is snapped to slidingly bridge the second longitudinal slit 77b.

The upper tube orifice 50 of the lower baghouse filter cage segment 41a is compressed as depicted in the direction of the horizontal arrows, by compressing the longitudinal slits 76a, 77a against an intrinsic spring action of the lower baghouse filter cage segment 41a; inserted into the locking ring 70; and allowed to expand again, such that the outwardly extended flange 72a is received in the lower slot 84a of the locking ring 70.

Turning now to FIG. 4b, the lower tube orifice 52 of the upper baghouse filter cage segment 41b is compressed as depicted in the direction of the horizontal arrows, by compressing the longitudinal slits 76b, 77b against an intrinsic spring action of the upper baghouse filter cage segment 41b, and inserted into the locking ring 70, such that the lower tube orifice 52, defined by the longitudinal bar tip ends 78b, extends into the upper tube orifice 50 of the lower baghouse filter cage segment 41a. Then, the lower tube orifice 52 of the upper baghouse filter cage segment 41b is allowed to expand again, such that said lower tube orifice 52 abuts against the upper tube orifice 50 of the lower baghouse filter cage segment 41a, and the outwardly extended flange 72b of the upper baghouse filter cage segment 41b is received in the upper slot 84b (FIG. 4a) of the locking ring 70.

Finally, as is illustrated in FIG. 4c, the lower tube orifice 52 of the upper baghouse filter cage segment 41b is locked in expanded state by sliding down the sliding elements 80, 81 to a locking position, in which the widths of the longitudinal slits 76b, 77b of the lower tube orifice 52 of the upper baghouse filter cage segment 41b are locked in expanded state, and the outwardly extended flange 72b of the upper baghouse filter cage segment 41b thereby is trapped in upper interior slot 84b (FIG. 4a) of the locking ring 70. The outwardly extended flange 72a of the lower baghouse filter cage segment 41a is thereby trapped in the lower interior slot 84a (FIG. 4a) of the locking ring 70 by the locked lower tube orifice 52 of the upper baghouse filter cage segment 41b extending into and abutting against the upper tube orifice 50 of the lower baghouse filter cage segment 41a. In the position illustrated in FIG. 4c, the longitudinal bar tip ends 78b of the upper baghouse filter cage segment 41b extend into the lower baghouse filter cage segment 41a, and mesh with longitudinal bars 42 of the lower baghouse filter cage segment 41a, such that the upper and lower baghouse filter cage segments 41a-b are prevented from rotating relative to each other. As illustrated in FIG. 4c, the upper and lower baghouse filter cage segments 41a-b together form a multi-segment baghouse filter cage 38 (FIG. 1). Alternatively, as will be appreciated by those skilled in the art, a baghouse filter cage may be formed by one single segment of said upper and lower segments 41a-b, said baghouse filter cage thereby being a single-segment baghouse filter cage.

Figure 5:
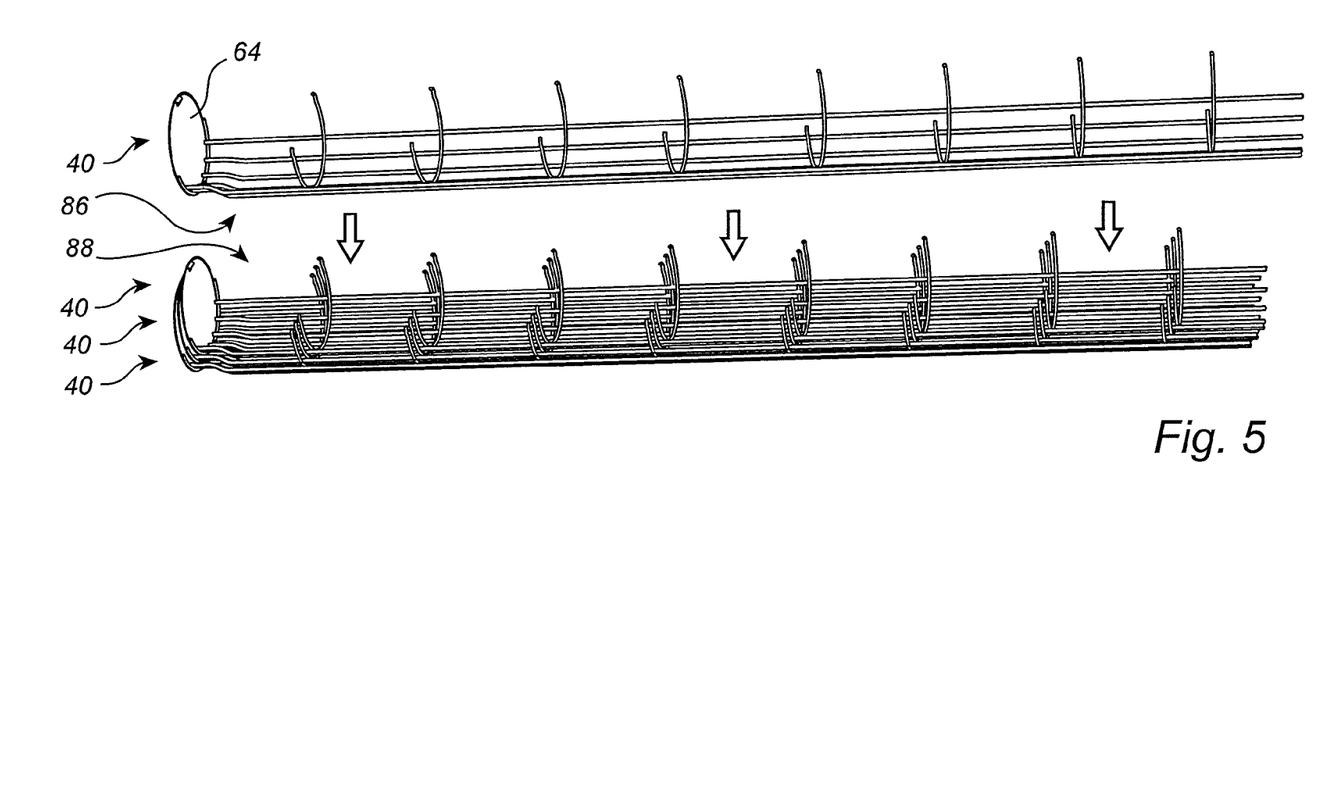
FIG. 5 is a diagrammatic view in perspective of a stack of filter cage wall elements.
Figure 6A:
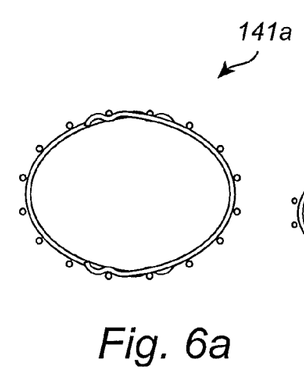
FIGS. 6a-f are diagrammatic end views, each illustrating an end of a baghouse filter cage segment.
Figure 6B:
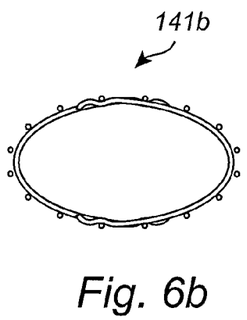
Figure 6C:
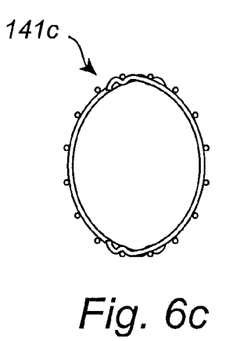
Figure 6D:
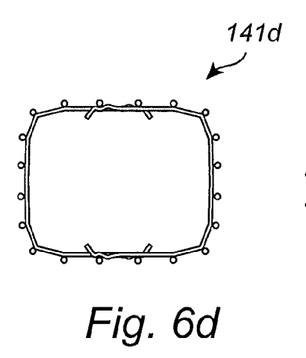
Figure 6E:
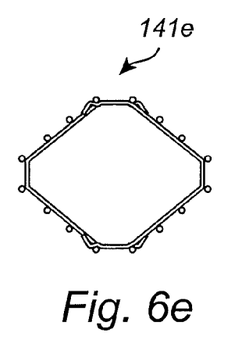
Figure 6F:
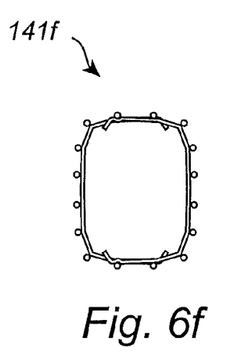

The baghouse filter cage segments 41a-b described hereinbefore are easier to handle than the baghouse filter cage segments previously known in the art, since each of the baghouse filter cage segments 41a-b may be handled, e.g. transported or stored, in the form of their separate constituents, i.e. the filter cage wall elements 40a-b (FIGS. 2a-b). Furthermore, they may be arranged in a very compact volume, so as to allow for very space-efficient storage and transport. FIG. 5 illustrates how a plurality of filter cage wall elements 40 may be stacked on top of each other, an exterior surface 86 of one filter cage wall element 40 resting against an interior surface 88 of another filter cage wall element 40. Even though the filter cage wall elements 40 of FIG. 5 are provided with a bottom cuff 64, the same stacking method may be applied to filter cage wall elements having no bottom cuff.

The invention has mainly been described above with reference to a few exemplary embodiments. However, as is readily appreciated by a person skilled in the art, other embodiments than the ones disclosed above are equally possible within the scope of the invention as defined by the appended patent claims, and equivalents may be substituted for elements of the invention without departing from the scope of the invention. In addition, many modifications may be made to adapt a particular situation or material to the teachings of the invention without departing from the essential scope thereof.

For example, hereinbefore, the assembly of two hemitubular shaped filter cage wall elements 40a-b into a tubular baghouse filter cage segment 41 having a circular cross-section has been described. However, the invention is not limited to filter cage wall elements for forming baghouse filter cage segments of a circular cross-section. FIGS. 6a-f are schematic end views illustrating a few exemplary baghouse filter cage segments 141a-f having non-circular cross-sections, such as oval (FIGS. 6a-c), rectangular (FIGS. 6d, 6f), or hexagonal (FIG. 6e) cross-sections. It will be appreciated that filter cage wall elements of many different shapes may be assembled to form many different shapes of the cross-section of the baghouse filter cage segment. Similarly, the filter cage wall elements may taper, so as to form a tapering baghouse filter cage segment.

Figure 7:
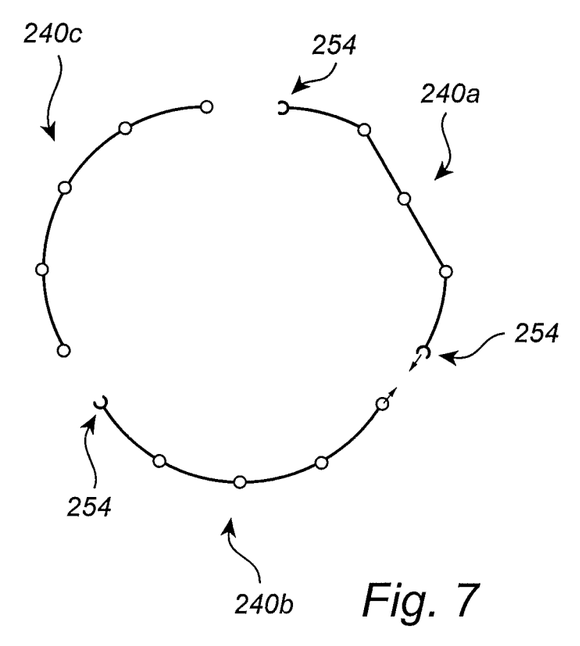
FIG. 7 is a diagrammatic end view illustrating ends of three filter cage wall elements for forming a baghouse filter cage segment.

The invention is not limited to identical filter cage wall elements for combining in pairs. FIG. 7 is an end view schematically illustrating three filter cage wall elements 240a-c adapted to be snapped together so as to form a baghouse filter cage segment. The three filter cage wall elements each differ in shape, and two filter cage wall elements 240a-b are provided with fastening devices 254 for attaching each of the three filter cage wall elements 240a-c together by their respective long sides, which extend perpendicularly to the plane of the top view. It will be appreciated that any other number of filter cage wall elements may be used for assembling a baghouse filter cage segment. Each of the wall elements 40a-b, 240a-c described herein may be used as primary or complementary filter cage wall elements.

Clearly, the invention is not limited to any particular type of fastening devices; even though snap-lock attachments provide ease of assembly, also filter cage wall elements having other types of fastening devices may provide the benefit of compact transport and storage. Likewise, a fastening device of a long side of a filter cage wall element does not need to be integral with or attached to a transversal support member; it can be located anywhere along the long side of the filter cage wall element, and/or it may be designed to mate or cooperate with completely separate fastening means, such as a screw or a clamp.

The subject baghouse filter cage does not need to be formed by longitudinal bars and transversal support elements; it may be formed by any other suitable grate or mesh structures known in the art, such as a perforated metal sheet. The term "grate" encompasses any two-dimensional gas-permeable structure having the function of a mesh, grate, grid, screen or the like suitable for supporting filter fabric.

The invention claimed is:

1. A filter cage, comprising:
a primary filter cage wall element and a complementary filter cage wall element, wherein said primary filter cage wall element is formed as a grate and includes an end forming a portion of a tube orifice for a filter cage segment;
a long side of said primary filter cage wall element is configured for connecting to a long side of a complementary filter cage wall element, the long side of said primary filter cage wall element being provided with a fastening device configured for attachment to said long side of said complementary filter cage wall element;
the primary filter cage wall segment further including a plurality of peripherally spaced, longitudinal bars fixed by a plurality of transversal support members to form said grate;
wherein at least one of said transversal support members is a bar with a portion thereof extending beyond said long side of said primary filter cage wall element to form said fastening device;
wherein the complementary filter cage wall element is formed as a grate comprising a plurality of peripherally spaced, longitudinal bars fixed by a plurality of transversal support members to form a grate; and
wherein the fastening device of the primary filter cage wall element is connectable to at least a longitudinal bar of the complementary filter cage wall element, and wherein said fastening device is a snap-lock, wherein said snap-lock is formed by a snap-lock portion that extends beyond said long side of said primary filter cage wall element and wherein each of the transversal support members of said primary and said complementary filter cage wall elements have a first end and a second end, each of the first and second ends extending beyond said long side of said filter cage wall element and provides a locking notch formed by an arc bend, and wherein said locking notch is configured to receive and retain a longitudinal bar of a corresponding filter cage wall element.

2. The filter cage according to claim 1, wherein said primary filter cage wall element comprises:
a second long side configured for attachment to a second long side of said complementary filter cage wall element.

3. The filter cage according to claim 2, comprising:
said complementary filter cage wall element in combination with the primary filter cage wall element, wherein said second long side of said primary filter cage wall element engages with a fastening device of said second long side of said complementary filter cage wall element, the fastening device of said complementary filter cage wall element being identical to the fastening device of the primary filter cage wall element, and wherein the fasterninq device of said second long side is a snap-lock.

4. The filter cage according to claim 3, wherein said primary filter cage wall element is identical to and connects to said complementary filter cage wall element.

5. The filter cage according to claim 1, wherein an end of said primary filter cage wall element includes a bottom cuff comprising:
an interior facing slot for receiving an outwardly extended flange of an end of said complementary filter cage wall element, for forming a pivoting flange-cuff engagement.

6. The filter cage according to claim 1, comprising:
a lock member for releasably locking a width of a longitudinal slit extending from said tube orifice.

7. The filter cage according to claim 1, wherein the bars of the transversal support are formed of a metal wire.

8. The filter cage according to claim 1, wherein at least one notch of the transveral support memebers of each of the primary and secondary cage wall element further includes an opposing arc bend to form a cam.

9. The filter cage according to claim 1, wherein at least the primary filter cage wall element and the complementary filter cage wall element form a first filter cage element; and wherein the filter cage further comprises a locking ring for securing one end of the first filter cage segment to one end of a second filter cage segment.

10. The filter cage according to claim 1, further comprising a third filter cage wall element having a long side configured for connecting to a second long side of the primary filter cage wall element, the third filter cage wall segment including a plurality of peripherally spaced, longitudinal bars fixed by a plurality of transversal support members to form a grate and at least one of said transversal support members is a bar;
wherein the at least one of the transversal support members of the third filter cage wall element has a first end and a second end, each of the first and second ends extending beyond the long side of the third filter cage wall element and provides a locking notch formed by an arc bend, and wherein said locking notch of the third filter cage wall element is configured to receive and retain a longitudinal bar of the primary filter cage wall element.

11. A filter cage, comprising:
a primary filter cage wall element and a complementary filter cage wall element, wherein the primary filter cage wall element and the complementary filter cage wall element are each formed as a grate and includes an end forming a portion of a tube orifice;
wherein the primary filter cage wall element and complementary filter cage wall element each includes a plurality of peripherally spaced, longitudinal bars fixed by a plurality of transversal support members formed of a bar to form each of the respective grates; and
wherein each of the transversal support members of the primary filter cage wall element and said complementary filter cage wall element have a first end and a second end, each of the first and second ends extending beyond a side of said respective primary filter cage wall element and complementary filter cage wall element; each of the first and second ends of the transversal support members provides a locking notch formed by an arc bend, and wherein said locking notch is configured to receive and retain a longitudinal bar of the other corresponding filter cage wall element.

12. A filter cage, comprising:
a primary filter cage wall element and a complementary filter cage wall element, each of which having a first side, a second side and an end forming a portion of a tube orifice;
wherein the first side of the primary filter cage wall element is configured for connecting to the first side of the complementary filter cage wall element;
each of the primary filter cage wall element and the complementary filter cage wall element including a plurality of peripherally spaced, longitudinal bars fixed by a plurality of transversal support members to form respective grates, wherein each transversal support member is a bar;
wherein at least one of the transversal support members of the primary filter cage wall element and at least one of the complementary filter cage wall elements each have a first end extending beyond the first side of the respective primary filter cage wall element and the complementary filter cage wall element, each of the first ends of the at least one transversal support members providing a locking notch formed by an arc bend, and wherein the locking notch is configured to receive and retain a respective longitudinal bar of the primary and complementary filter cage wall element to connect the first sides of the primary and complementary filter wall elements; and
wherein at least one of the transversal support members of the primary filter cage wall element and at least one of the complementary filter cage wall elements each have a second end extending beyond the second side of the respective primary filter cage wall element and the complementary filter cage wall element, each of the second ends of the at least one transversal support members providing a locking notch formed by an arc bend, and wherein the locking notch is configured to receive and retain a longitudinal bar of another filter cage wall element.

13. The filter cage according to claim 12, wherein an end of the primary filter cage wall element includes a bottom cuff comprising:
an interior facing slot for receiving an outwardly extended flange of an end of the complementary filter cage wall element, for forming a pivoting flange-cuff engagement.

14. The filter cage according to claim 12, wherein the bars of the transversal support are formed of a metal wire.

15. The filter cage according to claim 12, wherein the primary filter cage wall element and the complementary filter cage wall element are shaped to provide the filter cage with at least one of a circular cross-section, a non-circular cross-section, an oval cross-section, a rectangular cross-section, and a hexagonal cross-section.

16. The filter cage according to claim 12, wherein the primary filter cage wall element and the complementary filter cage wall element are shaped differently.

17. The filter cage according to claim 12, wherein at least one notch of the transveral support memebers of each of the primary and complementary wall element further includes an opposing arc bend to form a cam.

18. The filter cage according to claim 12, wherein at least the primary filter cage wall element and the complementary filter cage wall element form a first filter cage element; and further compising a locking ring for securing one end of the first filter cage segment to one end of a second filter cage segment.

19. The filter cage according to claim 12, wherein the another filter cage wall element is one of the at least primary and complementary filter cage wall elements.

20. The filter cage according to claim 12, wherein the another filter cage wall element includes a third filter cage element having a long side configured for connecting to a second side of the primary filter cage wall element, the third filter cage wall segment including a plurality of peripherally spaced, longitudinal bars fixed by a plurality of transversal support members to form a grate, wherein each of the transversal support members is a bar;

wherein at least one of the transversal support members of the third filter cage wall element has a first end extending beyond the first side of the third filter cage wall element and provides a locking notch formed by an arc bend, and wherein the locking notch of the third filter cage wall element is configured to receive and retain a longitudinal bar of the primary filter cage wall element.

* * * * *